United States Patent
Li et al.

(10) Patent No.: US 9,183,972 B2
(45) Date of Patent: Nov. 10, 2015

(54) MAGNETIC, ACRYLIC STRONGLY BASIC ANION EXCHANGE MICROSPHERE RESIN AND THE MANUFACTURING METHOD THEREOF

(75) Inventors: Aimin Li, Nanjing (CN); Chendong Shuang, Nanjing (CN); Chao Long, Nanjing (CN); Fuqiang Liu, Nanjing (CN); Jinnan Wang, Nanjing (CN); Qing Zhou, Nanjing (CN); Yuzhi Xue, Nanjing (CN); Youdong Zhou, Nanjing (CN); Mancheng Zhang, Nanjing (CN); Weiben Yang, Nanjing (CN); Zhaolian Zhu, Nanjing (CN)

(73) Assignee: NANJING UNIVERSITY (CN)

( * ) Notice: Subject to any disclaimer, the term of this patent is extended or adjusted under 35 U.S.C. 154(b) by 119 days.

(21) Appl. No.: 13/146,433
(22) PCT Filed: Jul. 5, 2010
(86) PCT No.: PCT/CN2010/074981
§ 371 (c)(1), (2), (4) Date: Aug. 22, 2011
(87) PCT Pub. No.: WO2011/085583
PCT Pub. Date: Jul. 21, 2011

(65) Prior Publication Data
US 2013/0341554 A1 Dec. 26, 2013

(30) Foreign Application Priority Data
Jan. 12, 2010 (CN) .......................... 2010 1 0017687

(51) Int. Cl.
*H01F 1/01* (2006.01)
*C08L 33/24* (2006.01)
*C08F 2/44* (2006.01)
*C08K 3/22* (2006.01)

(52) U.S. Cl.
CPC .. *H01F 1/01* (2013.01); *C08F 2/44* (2013.01); *C08L 33/24* (2013.01); *C08K 2003/2265* (2013.01); *C22C 2202/02* (2013.01); *Y10S 428/90* (2013.01)

(58) Field of Classification Search
CPC ........... C07K 1/18; H01F 1/01; H01F 1/0063; H01F 1/445; C22C 2202/02; C08F 2/44; Y10S 428/90; C08K 2003/2265; C08L 33/04; C08L 33/24; C08L 39/00
See application file for complete search history.

(56) References Cited

U.S. PATENT DOCUMENTS

| 2,630,427 A * | 3/1953 | Hwa ............................... 521/32 |
| 5,900,146 A * | 5/1999 | Ballard et al. ................ 210/222 |
| 2008/0099715 A1* | 5/2008 | Adams et al. .............. 252/62.54 |

FOREIGN PATENT DOCUMENTS

EP 304143 A1 * 2/1989

*Primary Examiner* — Satya Sastri
(74) *Attorney, Agent, or Firm* — Schmeiser, Olsen & Watts, LLP

(57) ABSTRACT

This invention relates to the field of resin, particularly to a magnetic, acrylic strongly basic anion exchange microsphere resin and its manufacturing method. Its basic structure is as follow:

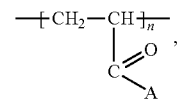

wherein its matrix contains magnetic grains and A is a group containing quaternary ammonium salts; the manufacturing method is: taking acrylic compounds as the monomer and mixing it with the crosslinking agent and porogenic agent to form an oil phase; evenly mixing the oil phase with magnetic grains and then conducting suspension polymerization; aminating and alkylating the polymerized magnetic grains so as to form the quaternary ammonium salts, namely the magnetic, acrylic strongly basic anion exchange microsphere resin. The exchange capacity of this resin is higher than that of any magnetic strongly basic anion exchange microsphere resin available either on both Chinese and overseas markets or in literature; it is able to take the place of the traditional strongly basic anion exchange resin in separating and removing soluble organics, particularly precursors of disinfection by-products, and various anions such as nitrates and phosphates.

9 Claims, 1 Drawing Sheet

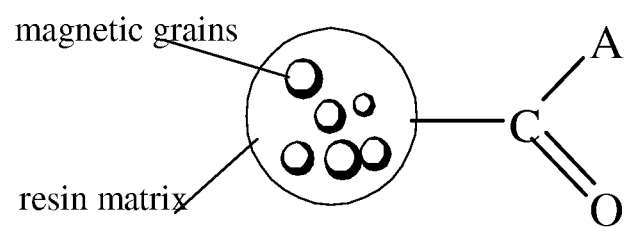

MAGNETIC, ACRYLIC STRONGLY BASIC ANION EXCHANGE MICROSPHERE RESIN AND THE MANUFACTURING METHOD THEREOF

FIELD OF TECHNOLOGY

The following relates to an acrylic strongly basic anion exchange microsphere resin and its manufacturing method, particularly to an acrylic strongly basic anion exchange microsphere resin containing magnetic grains within and its manufacturing method.

BACKGROUND

Currently, the magnetic, strongly basic anion exchange resin has been occasionally used in removing some impurities from water. Thanks to its comparatively smaller grain diameter, which is commonly around 150~180 nm, this type of resin presents higher specific surface area and consequently better kinetic performance. MIEX resin is a big-hole acrylic resin developed by Orica, an Australia-based cooperation. It has strongly basic anion exchange groups and therefore presents good effect in removing nitrates, sulfates, phosphates, arsenates in water as well as soluble organic pollutants, including precursors of some disinfection by-products The magnetic resin is usually manufactured through introducing magnetic grains into an oil phase and then conducting a polymerization process. The magnetic ion exchange resin disclosed in both U.S. Pat. No. 2,642,514 and CN 101440166 is synthesized through such a polymerization process wherewith the magnetic grains can be evenly diffused in the monomer. However, the grain diameters of the resin manufactured through this method are not uniform and the whole synthesization process cannot be ideally controlled. Both U.S. Pat. No. 5,900,146 and CN 1699447 disclosed a method that a stabilizing agent containing amines was used to diffuse $Fe_3O_4$ into an oil phase, however, this method presents a defect that the reaction will occur between the stabilizing agent and the active groups in the monomer, which consequently limits the total exchange capacity of the resin. U.S. Pat. No. 5,900,146 mentioned a new synthesization method of the magnetic strongly basic anion exchange resin. The structure obtained through polymerization of activated glycidyl methacrylate (GMA) monomers has epoxide groups that can directly form the quaternary ammonium salt through reaction with the tri-methylamine hydrochloride (TMAHC). An acrylic strongly basic anion exchange resin is therefore synthesized. But this resin manufactured in this way is fragile, in addition, the vulnerable epoxide group is easily to be inactivated during the polymerization process. According to all literature available currently, the strong base exchange capacity of all strongly basic ion exchange resin that is manufactured with GMA as the monomer is lower than 3.0 mmol/g.

SUMMARY

1. The Technical Problems to be Solved

In order to solve such problems as uneven diffusion of magnetic grains in the monomer, ununiformity of the diameter of resin grains and difficult controllability of the polymerization process, this invention provides a new magnetic, acrylic strongly basic anion exchange microsphere resin and its manufacturing method. With cheap raw materials and simple manufacturing procedure, this method is able to realize the stable and even diffusion of magnetic grains in the polymer; the magnetic acrylic strongly basic anion exchange microsphere resin manufactured with this method presents higher magnetism and higher exchange capacity.

2. Technical Solutions

The technical mechanism of this invention is: taking an acrylic compound as the monomer and mixing it with the cros slinking agent and the porogenic agent to form an oil phase; evenly mixing the oil phase with the magnetic grains so that suspension polymerization will occur. After polymerization, the magnetic polymerized grains undergo amination and alkylation to form quaternary ammonium salts, namely, the magnetic, acrylic strongly basic anion exchange microsphere resin.

The technical solutions provided include:

a magnetic, acrylic strongly basic anion exchange microsphere resin, consisting of a matrix of the anion exchange microsphere resin and magnetic grains diffused therein; its basic structure is as follow:

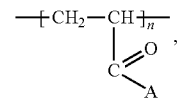

wherein its matrix contains magnetic grains and A is a group containing quaternary ammonium salts.

The said group A can be one of the following 16 groups:

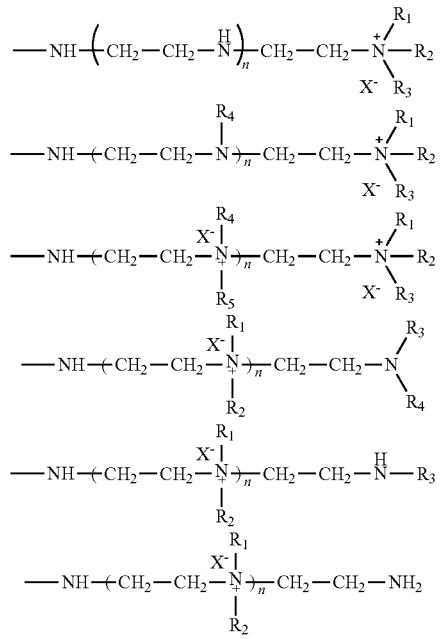

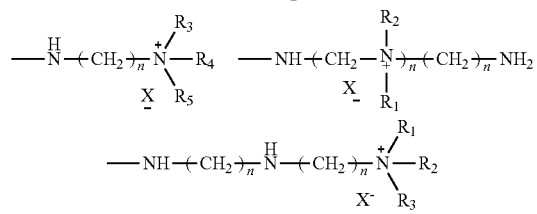

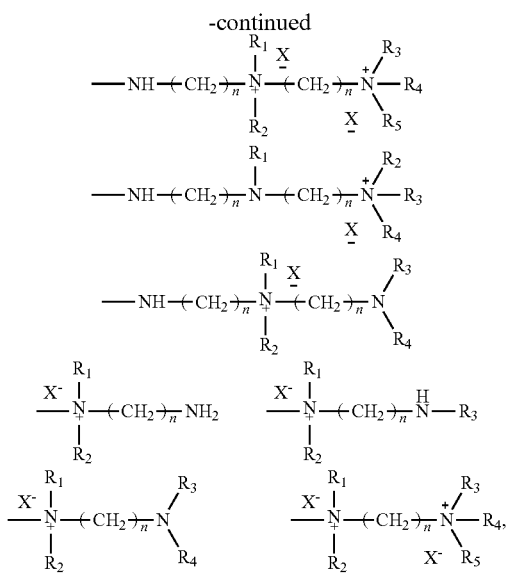

X can be Cl or OH; $R_1, R_2, R_3, R_4, R_5$ are alkyl groups, n is 1, 2, 3, . . . 20;

The grain diameter of the said magnetic, acrylic strongly basic anion exchange microsphere resin is 70~400 μm, preferably 80~250 μm.

The said magnetic grains refer to grains made of $Fe_3O_4$, $\gamma$-$Fe_2O_3$, stainless steel or iron-nickel alloy; the grains have been coated with one or several of such materials as fatty acid, tetraethoxysilane or other silane coupling agents, dimyristoylphosphatidylcholine (DMPC), octadecanoic acid, sodium laurate, oleic acid, oleyl amine, sorbitan oleate, sodium dodecyl benzene sulfonate (SDBS), polyvinyl alcohol, methacrylic acid and methyl methacrylate; the diameter of the grains is 0.01~1 μm, preferably 0.01~0.5 μm.

The specific saturation magnetization of the said magnetic, acrylic strongly basic anion exchange microsphere resin is 8~30 emu/g.

The strong base exchange capacity of the said magnetic, acrylic strongly basic anion exchange microsphere resin is 3.0~535 mmol/g;

The manufacturing procedure of the said magnetic, acrylic strongly basic anion exchange microsphere resin includes the following steps:

(a) adding 0.2~3% dispersant, 2~23% sodium chloride or 2~20% sodium carbonate (both by mass percentage) into a water phase. The dispersant can be gelatine, polyvinyl alcohol, activated calcium phosphate, guar gum, hydroxyethyl cellulose, methyl cellulose, SDBS or sodium lignosulphonate;

(b) an oil phase consisting of the reactant and the porogenic agent, the weight ratio between the reactant and the porogenic agent is 1:0.1~1:0.5; the reactant consisting of the monomer and the crosslinking agent, the weight ratio between the monomer and the crosslinking agent is 1:0.02~1:0.2.

The monomer used in Step (b) can be one or several of such materials as acrylic acid, methacrylic acid, methyl acrylate, ethyl acrylate, butyl acrylate, methyl methacrylate, butyl methacrylate, acrylonitrile and glycidyl methacrylate;

the crosslinking agent used in Step (b) can be one or several of such materials as ethylene glycol dimethacrylate, ethylene glycol diethyl diallylate, trimethacrylate (trimethylol propenoate), triallyl cyanurate and divinyl benzene;

the porogenic agent used in Step (b) can be one or several of such materials as methyl benzene, dimethyl benzene, ethyl acetate, 200# solvent naphtha, isopropanol, n-butanol, liquid paraffin, n-heptane, n-octane, isooctane, and n-decane;

the weight ratio between the reactant and the stabilizing agent used in step (b) is 1:0.05~1:0.5;

(c) adding into the oil phase an initiator, it can be 0.4~3% (by weight) benzoyl peroxide, azodiisobutyronitrile or a mixture of initiators; agitating the oil phase so that the initiator is fully dissolved. The mixture of initiators refers to the mixture of azodiisobutyronitrile and benzoyl peroxide, the weight ratio between azodiisobutyronitrile and benzoyl peroxide being 1:1~1:4;

(d) adding magnetic grains with diameter around 0.01~1 μm into the oil phase; the weight ratio between the magnetic grains and the reactant is 1:20~1:1; adding the oil phase containing the initiator and the magnetic grains into the water phase that is being agitated, the agitation velocity being 100~500 rpm; controlling the temperature at 50~80° C. for 2~8 hours of reaction and then keeping the temperature at 85~95° C. for 6~15 hours; cooling the material down and a resin in black or reddish brown color is obtained; drying the resin up in the air after extraction or washing treatment.

the magnetic grains mentioned in Step (d) are made of one or several of such materials as $Fe_3O_4$, $\gamma$-$Fe_2O_3$, stainless steel and iron-nickel alloy, the average diameter being 0.01~1 μm;

during Step (d), the magnetic grains and the oil phase can be firstly poured into a reactor, then agitating and controlling the temperature at 50~80° C.; after the oil phase is sufficiently mixed, adding in the water phase; after 2~8 hours of reaction, keeping the temperature at 85~95° C. for 6~15 hours;

(e) aminating the resin obtained in Step (d) with one or several of such materials as ethylene diamine, N,N-dimethyl propane diamine, N,N-dimethyl butane ditramine, diethylene triamine, triethylene tetramine, tetraethylene pentamine for 8~30 hours at 100~200° C.; the mass ratio between the resin and the aminating agent is 1:1~1:8;

(f) repeatedly washing the resin obtained in Step (e) with one or several of such materials as methanol, ethanol and acetone, and then washing it with water several times;

(g) putting the resin into an alkaline solution and adding in the alkylating agent, which can be methyl chloride, ethyl chloride, methyl bromide, ethyl bromide, methyl iodide or ethyl iodide, the mass ratio between the resin and the alkylating agent being 1:1~1:20; keeping the temperature at 20~150° C. for 2~30 hours of reaction, and then washing the substance and the magnetic strongly basic anion exchange microsphere resin is therefore obtained.

3. Advantageous Effects

This invention provides a magnetic, acrylic strongly basic anion exchange microsphere resin and its manufacturing method; the exchange capacity of the magnetic, acrylic strongly basic anion exchange microsphere resin manufactured with the method disclosed herein is higher than that of any magnetic strongly basic anion exchange microsphere resin, either that available on both Chinese and overseas markets or that only reported in the literature. The higher strong base exchange capacity, better kinetic (absorption and desorption) performance and convenience for separation enable this resin to take the place of the traditional strongly basic anion exchange resin; it presents especially advantageous effects on separating and removing soluble organics, precursors of disinfection by-products and anions such as nitrates and phosphates from water.

BRIEF DESCRIPTION OF THE DRAWINGS

FIG. 1 is the basic structure of the magnetic, acrylic strongly basic anion exchange microsphere resin disclosed in this invention.

DETAILED DESCRIPTION

Specific Embodiments

Embodiment 1

Adding 500 g aqueous solution containing 3% gelatine and 23% sodium chloride (both by weight) into a 2 L three-neck flask, keeping the agitation speed at 100~150 rpm. Evenly mixing a mixed solution containing 100 g methyl acrylate, 2 g trimethacrylate (trimethylol propenoate), 1.0 g azodiisobutyronitrile, 100 g methyl benzene and 53 g ethyl acetate with 102 g magnetic grains made of $Fe_3O_4$, the diameter of the grains being 0.1 μm; adding the mixture into the three-neck flask and heating up to 50° C.; keeping the temperature for 8 hours and then further heating up to 85° C. and keeping the temperature for 15 hours; discharging the material from the flask, washing it with ethanol and then drying it up in the air; adding in ethylene diamine twice the weight of the material and keeping the temperature at 100° C. for 8 hours; discharging and washing the material with water, adding in 300 mL 10% liquid alkali and then 40.8 g methyl iodide, and keeping the temperature at 20° C. for 10 hours; discharging the material and transforming it with sodium chloride; washing the material and the magnetic strongly basic anion exchange microsphere resin is therefore obtained.

The diameter of the strongly basic ion exchange microsphere resin so obtained is 300~400 μm; its strong base exchange capacity and specific saturation magnetization reach 3.21 mmol/g and 30 emu/g respectively; its basic structural formula is:

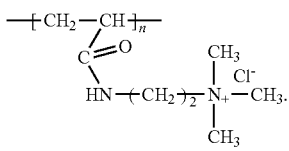

Embodiment 2

Adding 500 g aqueous solution containing 0.2% polyvinyl alcohol and 5% sodium chloride (both by weight) into a 2 L three-neck flask, keeping the agitation speed at 150~200 rpm. Evenly mixing a mixed solution containing 90 g methyl acrylate, 10 g methacrylic acid, 15 g trimethacrylate (trimethylol propenoate), 5 g triallyl cyanurate, 0.48 g benzoyl peroxide, 10 g methyl benzene and 2 g 200 # solvent naphtha with 6 g magnetic grains made of $Fe_3O_4$, the diameter of the grains being 0.1 μm; adding the mixture into the three-neck flask and heating up to 55° C.; keeping the temperature for 8 hours and then further heating up to 85° C.; keeping the temperature for 10 hours and then discharging the material from the flask. Washing the discharged material with ethanol and drying it up in the air, adding in N,N-dimethyl propane diamine 2.5 times of the weight of the material, and then keeping the temperature at 150° C. for 30 hours before discharge. Washing the material with water, adding in 300 mL 10% liquid alkali and then 63.0 g methyl iodide; keeping the temperature at 40° C. for 2 hours of reaction before discharge. Transforming the material with sodium chloride and washing it with water; the magnetic strongly basic ion exchange microsphere resin is therefore obtained.

The diameter of the magnetic strongly basic anion exchange microsphere resin so obtained is 200~300 μm; its strong base exchange capacity and specific saturation magnetization reach 5.5 mmol/g and 8 emu/g respectively; its basic structural formula is:

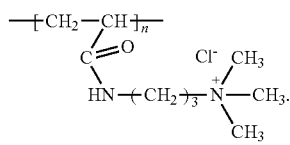

Embodiment 3

Adding 500 g aqueous solution containing 3% activated calcium phosphate and 20% sodium chloride (both by weight) into a 2 L three-neck flask, keeping the agitation speed at 400~500 rpm. Evenly mixing a mixed solution containing 90 g methyl acrylate, 10 g butyl methacrylate, 5 g trimethacrylate (trimethylol propenoate), 5 g divinyl benzene, 0.4 g azodiisobutyronitrile, 0.4 g benzoyl peroxide and 22 g 200# solvent naphtha with 11 g magnetic grains made of $Fe_3O_4$, the diameter of the grains being 0.1 μm; adding the mixture into the three-neck flask and heating up to 60° C.; keeping the temperature for 5 hours and then further heating up to 88° C.; keeping the temperature for 12 hours. Washing the discharged material with ethanol and drying it up in the air, adding in N,N-dimethyl butane diamine 4 times of the weight of the material, and then keeping the temperature at 200° C. for 10 hours before discharge. Washing the material with water, adding in 300 mL 10% liquid alkali and then 120 g methyl iodide; keeping the temperature at 50° C. for 20 hours of reaction before discharge. Transforming the material with sodium chloride and washing it with water; the magnetic strongly basic ion exchange microsphere resin is therefore obtained.

The diameter of the magnetic strongly basic anion exchange microsphere resin so obtained is 100~150 μm; its strong base exchange capacity and specific saturation magnetization reach 5.21 mmol/g and 13 emu/g respectively; its basic structural formula is:

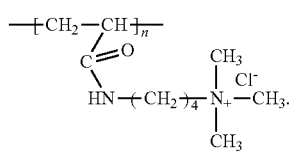

Embodiment 4

Adding 500 g aqueous solution containing 1.5% guar gum and 20% sodium chloride (both by weight) into a 2 L three-neck flask, keeping the agitation speed at 250~300 rpm. Evenly mixing a mixed solution containing 80 g ethyl acrylate, 20 g acrylic acid, 5 g trimethacrylate (trimethylol propenoate), 10 g ethylene glycol dimethacrylate, 1.1 g azodiisobutyronitrile, 2.1 g benzoyl peroxide, 50 g dimethyl benzene and 65 g isopropanol with 30 g magnetic grains made of $Fe_3O_4$, the diameter of the grains being 0.2 μm; adding the mixture into the three-neck flask and heating up to 65° C.; keeping the temperature for 6 hours and then further heating up to 90° C.; keeping the temperature for 5 hours and then discharging the material from the flask. Washing the discharged material with ethanol and drying it up in the air, adding in diethylene triamine 6 times of the weight of the material, and then keeping the temperature at 135° C. for 25 hours before discharge. Washing the material with water, adding in 300 mL 10% liquid alkali and then 310 g ethyl iodide, keeping the temperature at 50° C. for 20 hours of reaction before discharge. Transforming the material with sodium chloride and washing it with water; the magnetic strongly basic ion exchange microsphere resin is therefore obtained.

The diameter of the magnetic strongly basic anion exchange microsphere resin so obtained is 150~200 μm; its strong base exchange capacity and specific saturation magnetization reach 5.11 mmol/g and 21.1 emu/g respectively; its basic structural formula is:

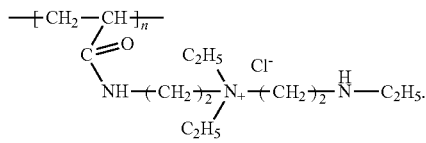

Embodiment 5

Adding 500 g aqueous solution containing 0.5% hydroxyethyl cellulose and 15% sodium chloride (both by weight) into a 2 L three-neck flask, keeping the agitation speed at 300~400 rpm. Evenly mixing a mixed solution containing 90 g butyl acrylate, 60 g methyl methacrylate, 5 g ethylene glycol dimethacrylate, 2.5 g triallyl cyanurate, 0.6 g azodiisobutyronitrile, 1.8 g benzoyl peroxide, 30 g n-butanol and 30 g liquid paraffin with 13 g magnetic grains made of $Fe_3O_4$, the diameter of the grains being 0.6 μm; adding the mixture into the three-neck flask and heating up to 60° C.; keeping the temperature for 5 hours and then further heating up to 90° C.; keeping the temperature for 8 hours and then discharging the material from the flask. Washing the discharged material with ethanol and drying it up in the air, adding in triethylene tetramine 5 times of the weight of the material, and then keeping the temperature at 180° C. for 20 hours before discharge. Washing the material with water, adding in 500 mL 10% liquid alkali and then 800 g methyl bromide; keeping the temperature at 70° C. for 30 hours of reaction before discharge. Transforming the material with sodium chloride and washing it with water; the magnetic strongly basic ion exchange microsphere resin is therefore obtained.

The diameter of the magnetic strongly basic anion exchange microsphere resin so obtained is 150~200 μm; its strong base exchange capacity and specific saturation magnetization reach 4.78 mmol/g and 13.1 emu/g respectively; its basic structural formula is:

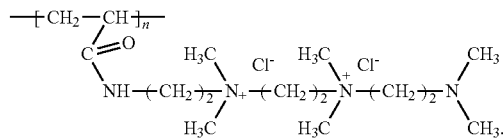

Embodiment 6

Adding 500 g aqueous solution containing 0.1% methyl cellulose and 15% sodium chloride (both by weight) into a 2 L three-neck flask, keeping the agitation speed at 250~300 rpm. Evenly mixing a mixed solution containing 140 g methyl acrylate, 40 g butyl methacrylate, 10 g trimethacrylate (trimethylol propenoate), 5 g triallyl cyanurate, 1 g azodiisobutyronitrile, 1.5 g benzoyl peroxide, 80 g dimethyl benzene and 60 g n-heptane with 11 g magnetic grains made of $Fe_3O_4$, the diameter of the grains being 0.8 μm; adding the mixture into the three-neck flask and heating up to 70° C.; keeping the temperature for 4 hours and then further heating up to 92° C.; keeping the temperature for 3 hours and then discharging the material from the flask. Washing the discharged material with ethanol and drying it up in the air, adding in tetraethylene pentamine 7 times of the weight of the material, and then keeping the temperature at 170° C. for 16 hours before discharge. Washing the material with water, adding in 300 mL 10% liquid alkali and then 1500 g methyl bromide; keeping the temperature at 90° C. for 25 hours of reaction before discharge. Transforming the material with sodium chloride and washing it with water; the magnetic strongly basic ion exchange microsphere resin is therefore obtained.

The diameter of the magnetic strongly basic anion exchange microsphere resin so obtained is 180~250 μm; its strong base exchange capacity and specific saturation magnetization reach 4.65 mmol/g and 10.5 emu/g respectively; its basic structural formula is:

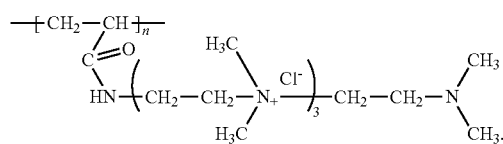

Embodiment 7

Adding 500 g aqueous solution containing 0.8% gelatine and 0.1% SDBS and 15% sodium bicarbonate (all by weight) into a 2 L three-neck flask, keeping the agitation speed at 450~500 rpm. Evenly mixing a mixed solution containing 140 g methyl acrylate, 20 g GMA, 10 g trimethacrylate (trimethylol propenoate), 20 g triallyl cyanurate, 0.76 g azodiisobutyronitrile, 3.04 g benzoyl peroxide, 200 g n-octane and 25 g n-decane with 13 g magnetic grains made of $Fe_3O_4$, the diameter of the grains being 0.6 μm; adding the mixture into the three-neck flask and heating up to 75° C.; keeping the temperature for 4 hours and then further heating up to 92° C.; keeping the temperature for 6 hours and then discharging the material from the flask. Washing the discharged material with ethanol and drying it up in the air, adding in diethylene triamine the same as the weight of the material and N,N-dimethyl butane diamine 3 times of the weight of the material, then keeping the temperature at 130° C. for 12 hours before discharge. Washing the material with water, adding in 300 mL 10% liquid alkali and then 600 g ethyl bromide; keeping the temperature at 80° C. for 16 hours of reaction before discharge. Transforming the material with sodium chloride and washing it with water; the magnetic strongly basic ion exchange microsphere resin is therefore obtained.

The diameter of the magnetic strongly basic anion exchange microsphere resin so obtained is 150~200 μm; its strong base exchange capacity and specific saturation magnetization reach 3.54 mmol/g and 12 emu/g respectively; its basic structural formula is:

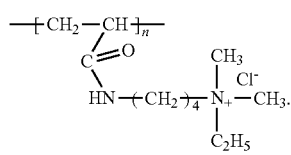

Embodiment 8

Adding 500 g aqueous solution containing 2.4% gelatine, 0.2% sodium lignosulphonate and 10% sodium chloride (all by weight) into a 2 L three-neck flask, keeping the agitation speed at 400~450 rpm. Evenly mixing a mixed solution containing 140 g acrylonitrile, 20 g trimethacrylate (trimethylol propenoate), 20 g divinyl benzene, 5.3 g azodiisobutyronitrile, 80 g methyl benzene and 30 g n-decane with 28 g magnetic grains made of $Fe_3O_4$, the diameter of the grains being 1 μm; adding the mixture into the three-neck flask and heating up to 80° C.; keeping the temperature for 2 hours and then further heating up to 95° C.; keeping the temperature for 6 hours and then discharging the material from the flask. Washing the discharged material with ethanol and drying it up in the air, adding in tetraethylene pentamine 5 times of the weight of the material, and then keeping the temperature at 180° C. for 10 hours before discharge. Washing the material with water, adding in 300 mL 10% liquid alkali and then 100 g ethyl bromide, keeping the temperature at 110° C. for 22 hours of reaction before discharge; transforming the material with sodium chloride and washing it with water; the magnetic strongly basic ion exchange microsphere resin is therefore obtained.

The diameter of the magnetic strongly basic anion exchange microsphere resin so obtained is 150~250 μm; its strong base exchange capacity and specific saturation magnetization reach 3.0 mmol/g and 12.7 emu/g respectively; its basic structural formula is:

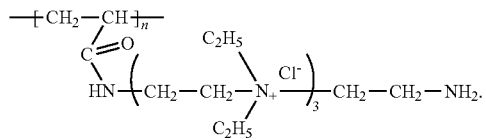

Embodiment 9

Adding 500 g aqueous solution containing 2.4% gelatine, 0.5% sodium lignosulphonate and 15% sodium chloride (all by weight) into a 2 L three-neck flask, keeping the agitation speed at 250~300 rpm. Evenly mixing a mixed solution containing 150 g methyl acrylate, 50 g acrylic acid, 20 g divinyl benzene, 5 g triallyl cyanurate, 6.75 g benzoyl peroxide, 150 g dimethyl benzene and 50 g isooctane with 40 g magnetic grains made of $Fe_3O_4$, the diameter of the grains being 0.5 μm; adding the mixture into the three-neck flask and heating up to 60° C.; keeping the temperature for 5 hours and then further heating up to 95° C.; keeping the temperature for 1 hour and then discharging the material from the flask. Washing the discharged material with ethanol and drying it up in the air, adding in diethylene triamine 7 times of the weight of the material, and then keeping the temperature at 140° C. for 10 hours before discharge. Washing the material with water, adding in 500 mL 10% liquid alkali and then 150 g methyl iodide, keeping the temperature at 60° C. for 18 hours of reaction before discharge; transforming the material with sodium chloride and washing it with water; the magnetic strongly basic ion exchange microsphere resin is therefore obtained.

The diameter of the magnetic strongly basic anion exchange microsphere resin so obtained is 150~200 μm; its strong base exchange capacity and specific saturation magnetization reach 3.89 mmol/g and 17.1 emu/g respectively; its basic structural formula is:

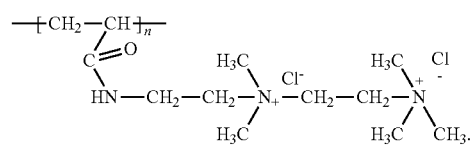

Embodiment 10

Changing 10 g trimethacrylate (trimethylol propenoate) and 5 g triallyl cyanurate into 30 g trimethacrylate (trimethylol propenoate) and keeping other components in the oil phase the same as Embodiment 6; Adding the oil phase into a 2 L three-neck flask, heating up to 60° C. and agitating for 10 minutes, then adding into 500 g aqueous solution containing 0.3% activated calcium phosphate and 2% sodium chloride (both by weight); heating up to 68° C. and keeping the temperature for 4 hours, and then further heating up to 95° C. and keeping the temperature for 8 hours before discharging the material from the flask. Conducting the same amination procedure as Embodiment 6. Washing the material with water, adding in 300 mL 10% liquid alkali and then 400 g ethyl iodide, keeping the temperature at 50° C. for 18 hours of reaction before discharge; transforming the material with sodium chloride and washing it with water; the magnetic strongly basic ion exchange microsphere resin is therefore obtained.

The diameter of the magnetic strongly basic anion exchange microsphere resin so obtained is 180~250 μm; its strong base exchange capacity and specific saturation magnetization reach 4.57 mmol/g and 10.31 emu/g respectively; its basic structural formula is:

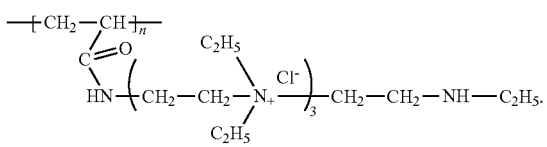

The invention claimed is:

1. A composition comprising:
a magnetic, acrylic strongly basic anion exchange microsphere resin, wherein basic structure of the resin is:

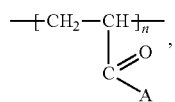

wherein a matrix of the resin contains magnetic grains and A is a group containing quaternary ammonium salts;
wherein A is one of the following groups:

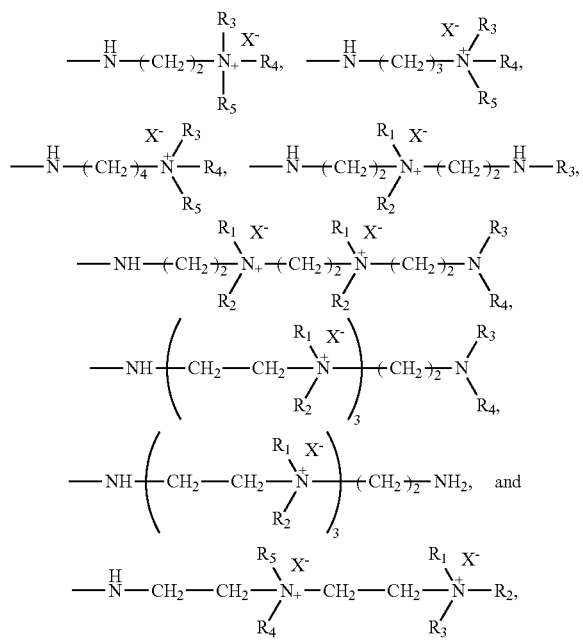

X being at least one of Cl and OH; $R_1, R_2, R_3, R_4, R_5$ are alkyl groups, n is 1 to 20;
wherein a strong base exchange capacity of the resin is 3.0~5.5 mmol/g.

2. The composition of claim 1, wherein a diameter of the resin microsphere is 70~400 μm, further wherein a specific saturation magnetization of the resin are 8~30 emu/g.

3. A method for manufacturing a magnetic, acrylic strongly basic anion exchange microsphere resin of claim 1, comprising:
(a) adding 0.2~3% dispersant and 2~23% sodium chloride (both by mass percentage) into a water phase;
(b) an oil phase consisting of a reactant and a porogenic agent, wherein a weight ratio between the reactant and the porogenic agent is 1:0.1~1:0.5; the reactant consisting of a monomer and a crosslinking agent, the weight ratio between the monomer and the crosslinking agent is 1:0.02~1:0.2;
(c) adding into the oil phase an initiator, the initiator being at least one of 0.4~3% (by weight) benzoyl peroxide, azodiisobutyronitrile and a mixture of initiators, and agitating the oil phase so that the initiator is fully dissolved;
(d) adding a plurality of magnetic grains with a diameter around 0.01~1 μm into the oil phase, wherein a weight ratio between the plurality of magnetic grains and the reactant is 1:20~1:1, and adding the oil phase containing the initiator and the magnetic grains into the water phase that is being agitated, the agitation velocity being 100~500 rpm; keeping the temperature at 50~80° C. for 2~8 hours of reaction and then keeping the temperature at 85~95° C. for 1~15 hours; cooling the material down and a resin in black or reddish brown color is obtained; drying the resin up in the air after extraction or washing treatment;
(e) aminating the resin obtained in Step (d) with an aminating agent for 8~30 hours at 100~200° C.; cooling the resin down and then washing it;
(f) repeatedly washing the resin obtained in Step (e) with a material selected from the group consisting of methanol, ethanol and acetone, and then washing it with water several times;
(g) putting the resin obtained in Step (f) into an alkaline solution and adding in the alkylating agent; the mass ratio between the alkylating agent and the resin is 0.2:1~8:1; keeping the temperature at 20~150° C. for 2~30 hours of reaction, and then washing the material and the magnetic strongly basic anion exchange microsphere resin is therefore obtained.

4. The method for manufacturing a magnetic, acrylic strongly basic anion exchange microsphere resin as defined in claim 3, wherein the dispersant used in Step (a) is selected from the group consisting of gelatine, polyvinyl alcohol, activated calcium phosphate, guar gum, hydroxyethyl cellulose, methyl cellulose, SDBS and sodium lignosulphonate.

5. The method for manufacturing a magnetic, acrylic strongly basic anion exchange microsphere resin as defined in claim 4, wherein the monomer used in Step (b) is selected from the group consisting of acrylic acid, methacrylic acid, methyl acrylate, ethyl acrylate, butyl acrylate, methyl methacrylate, butyl methacrylate, acrylonitrile and GMA; the crosslinking agent used in Step (b) is selected from the group consisting of ethylene glycol dimethacrylate, ethylene glycol diethyl diallylate, trimethacrylate (trimethylol propenoate), triallyl cyanurate and divinyl benzene; the porogenic agent used in Step (b) is selected from the group consisting of methyl benzene, dimethyl benzene, ethyl acetate, solvent naphtha, isopropanol, n-butanol, liquid paraffin, n-heptane, n-octane, isooctane and n-decane.

6. The method for manufacturing a magnetic, acrylic strongly basic anion exchange microsphere resin as defined in claim 3, wherein the weight ratio between azodiisobutyronitrile and benzoyl peroxide that constitute the mixture of initiators mentioned in Step (c) is 1:1~4.

7. The method for manufacturing a magnetic, acrylic strongly basic anion exchange microsphere resin as defined in claim 3, wherein the said magnetic grains refer to grains made of $Fe_3O_4$, $\gamma$-$Fe_2O_3$, stainless steel or iron-nickel alloy; the grains are coated with a material selected from the group consisting of fatty acid, tetraethoxysilane or other silane coupling agents, DMPC, octadecanoic acid, sodium laurate, oleic acid, oleyl amine, sorbitan oleate, SDBS, polyvinyl alcohol, methacrylic acid and methyl methacrylate.

8. The method for manufacturing a magnetic, acrylic strongly basic anion exchange microsphere resin as defined in claim 3, wherein the weight ratio between the aminating agent and the resin in Step (e) is 1:1~1:8; the alkylating agent mentioned in Step (g) is selected from the group consisting of methyl chloride, ethyl chloride, methyl bromide, ethyl bromide, methyl iodide and ethyl iodide.

9. The method for manufacturing a magnetic, acrylic strongly basic anion exchange microsphere resin as defined in claim 3, wherein Step (d) further comprises the steps of:
- pouring the magnetic grains and the oil phase into a reactor;
- agitating the magnetic grains and the oil phase, while keeping the temperature at 50~80° C.;
- adding the water phase to the magnetic grains and oil phase after the magnetic grains and oil phase is sufficiently mixed;
- keeping the temperature at 85~95° C. for 6~15 hours after 2~8 hours of reaction occurring at the step of adding the water phase.

* * * * *

UNITED STATES PATENT AND TRADEMARK OFFICE
CERTIFICATE OF CORRECTION

| | | |
|---|---|---|
| PATENT NO. | : 9,183,972 B2 | Page 1 of 1 |
| APPLICATION NO. | : 13/146433 | |
| DATED | : November 10, 2015 | |
| INVENTOR(S) | : Aimin Li et al. | |

It is certified that error appears in the above-identified patent and that said Letters Patent is hereby corrected as shown below:

On the title page, item 57 Abstract, fourth line, please change "as follow:" to --as follows--

In the Specification,

Column 2, line 9 of the printed patent, please change "cros slinking" to --crosslinking--

Signed and Sealed this
Seventh Day of June, 2016

Michelle K. Lee
*Director of the United States Patent and Trademark Office*